(12) United States Patent
De Caires

(10) Patent No.: US 8,269,374 B2
(45) Date of Patent: Sep. 18, 2012

(54) SOLAR PANEL POWER MANAGEMENT SYSTEM AND METHOD

(76) Inventor: Damian De Caires, Newark, NJ (US)

( * ) Notice: Subject to any disclaimer, the term of this patent is extended or adjusted under 35 U.S.C. 154(b) by 0 days.

(21) Appl. No.: 13/040,559

(22) Filed: Mar. 4, 2011

(65) Prior Publication Data

US 2011/0273019 A1    Nov. 10, 2011

Related U.S. Application Data

(60) Provisional application No. 61/310,506, filed on Mar. 4, 2010.

(51) Int. Cl.
*H02J 3/00* (2006.01)
*H02J 7/00* (2006.01)

(52) U.S. Cl. ............................... 307/82; 307/66

(58) Field of Classification Search .......... 307/66, 307/64, 82
See application file for complete search history.

(56) References Cited

U.S. PATENT DOCUMENTS

| 258,103 | A | 5/1882 | Mott |
| 856,465 | A | 6/1907 | Hawkings |
| 2,034,334 | A | 3/1936 | Falkenthal |
| 3,757,131 | A | 9/1973 | Krutz et al. |
| 4,143,283 | A | 3/1979 | Graf et al. |
| 4,227,098 | A | 10/1980 | Brown et al. |
| 4,730,121 | A | 3/1988 | Lee et al. |
| 4,742,291 | A | 5/1988 | Bobier et al. |
| 6,949,843 | B2 * | 9/2005 | Dubovsky ............... 307/64 |
| 7,248,946 | B2 | 7/2007 | Bashaw et al. |
| 7,783,390 | B2 | 8/2010 | Miller |
| 2006/0158037 | A1 | 7/2006 | Danley et al. |
| 2009/0273240 | A1 * | 11/2009 | Gurunathan et al. ......... 307/64 |

OTHER PUBLICATIONS

S. Brunton, C. Rowley and S. Kulkarni, "Maximum power point tracking for photovoltaic optimization using extreme seeking," Proceedings of the 2006 IEEE Industry Applications Society Annual Meeting, Tampa, Oct. 8-12, 2006.

* cited by examiner

*Primary Examiner* — Michael Rutland Wallis
(74) *Attorney, Agent, or Firm* — Leason Ellis LLP

(57) ABSTRACT

A controlled switching arrangement from a first mode of power transfer, in which an ecological power source (EPS) directly charges a battery during times of a utility power outage to a second mode of power transfer in which the EPS output is fully delivered through a grid-interactive inverter so as to provide A.C. power to the grid power connection. A single switching operation switches between power transfer modes as a function of an availability of the utility power output over the grid power connection such that a percentage of utility power output is supplied directly to the battery in the second mode so as to maintain the battery in a charged condition for use during the times of the utility power outage, and an off-grid inverter converts charge stored in the battery into A.C. power when the controller is switched to the first mode of power transfer.

13 Claims, 7 Drawing Sheets

The Worlds SMALLEST & most EFFICIENT
Grid Interactive Solar Battery Backup System

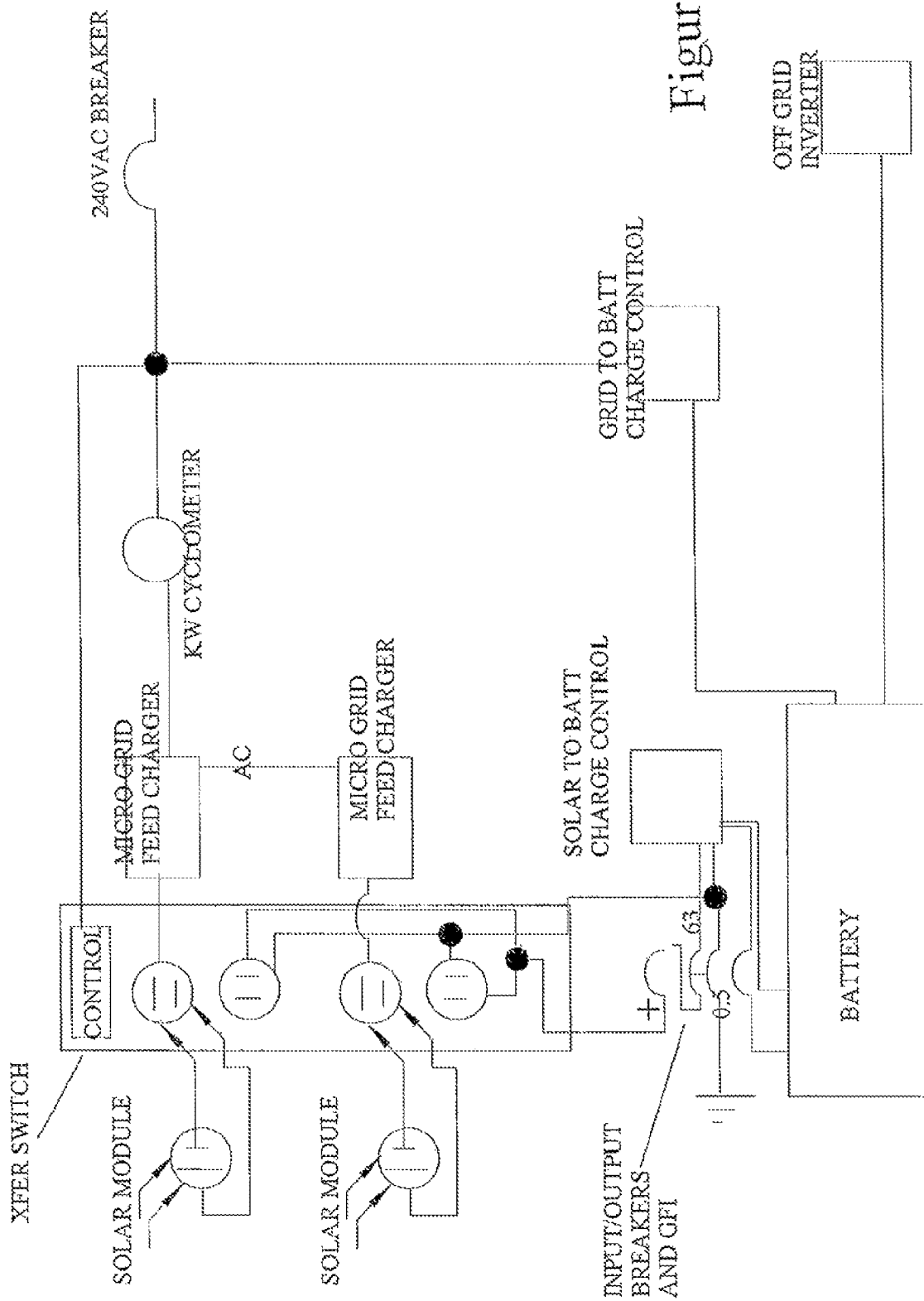

SOLAR PANEL POWER MANAGEMENT SYSTEM AND METHOD

FIELD OF THE INVENTION

The present invention relates to the field of solar panel power management and, more particularly, relates to a system architecture that balances an ecological power source with a grid power connection.

BACKGROUND OF THE INVENTION

There have been efforts in power electronic design for coupling to a power grid any excess energy that has been tapped from an ecological resource (such as wind or solar energy collectors or some other D.C. source) and also to provide energy storage capability for power grid outages. Outback Power and Xantrex describe DC Coupled system designs. SMA Technologies have an AC coupled design. Apollo Energy and Morningstar Technologies, on information and belief, is developing their own branded AC Coupling. Beacon Power had a 5 KW grid interactive DC coupled device which, on information and belief, has been discontinued by that manufacturer. Princeton University has a 100 KW inverter system that, on information and belief, is the only known commercial class in the field of grid interactive battery backup. Apollo Energy also has an off-grid 3-5 KW class device that allows the ecological source to charge a battery and simulate an AC utility power grid.

TerraWatt power (formerly Advanced Energy Conversion) has developed a product known as the Ecojoule 2500 which may be the first grid-interactive capable, with backup power capable battery-less system. To achieve this functionality, TerraWatt power's ecojoule 2500 internally switches an array of solar cells from a grid feed low capacitance mode to an off-grid high capacitance mode (coupled to an internal super-capacitor ("supercaps") storage device), thereby enabling power for protected loads during a power outage while the solar cells are energized via the photo-electric effect.

Known approaches suffer from inefficiencies due, at least in part to having multiple power conversions. In a typical grid-interactive with battery backup DC coupled system, the solar array has to be converted to usable power for a battery and then an inverter has to take the usable battery power and 'invert' it to usable AC power for the utility. Such feeds can cause the efficiency of an inverter to drop substantially—because even minor fluctuations in battery temperature will affect a battery's ability to hold a charge and therefore affect the amount of available power sent to the AC power grid. This method requires two steps of conversion before the power is exported creating multiple conversion loss.

Accordingly, attempts have been made to use AC coupling in which regular battery-less inverters send power from the ecological source direct to the AC power grid. This does improve the conversion losses; however, when operated off-grid a second inverter presents a false utility grid signal to the first inverter causing it to turn on and then the two inverters work in tandem to charge a battery and maintain a protected AC load service. An AC coupled system is efficient at sending power to the utility, but multiple conversions are presented when it is in off-grid mode and that makes it an inefficient arrangement for sending power to a battery. The invention provides improvements in this art area, particularly, in the management and balance of power between an ecological power source, a grid power connection and the battery.

By having the ecological source on a transfer where it can charge a battery directly or send the charge to the AC power grid depending on the availability of the utility power, the solution provided by the present invention achieves a single conversion step switch in both modes of operation to thereby minimize the conversion losses.

SUMMARY OF THE INVENTION

In accordance with one aspect of the invention, a method is provided for balancing respective outputs of an ecological power source ("EPS"), a grid power connection, and a battery so as to minimize conversion losses. The method includes providing first and second modes of power transfer. In a first mode of power transfer, the EPS output directly charges the battery during times of a utility power outage. In a second mode of power transfer, the EPS output is fully delivered through a grid-interactive inverter so as to provide A.C. power to the grid power connection. The method includes controlling, in a single switching operation, the first and second modes of power transfer as a function of an availability of the utility power output over the grid power connection such that a percentage of utility power output over the grid power connection is supplied directly to the battery when the controller is switched to the second mode of power transfer so as to utilize the output of the grid power connection as a source to maintain the battery in a charged condition for use during the times of the utility power outage, and an off-grid inverter converts charge stored in the battery into A.C. power when the controller is switched to the first mode of power transfer.

In accordance with a further aspect of the invention, a method as described can have each of the power transfer modes provide a one-step conversion of the output of the EPS into A.C. power such that energy from the EPS is transferred to the grid power connection after inversion by a grid-interactive inverter free of any battery storage when in the first mode of power transfer, and energy from the EPS is transferred to a load after inversion by an off-grid inverter when in the second mode of power transfer.

These and other features, aspects and advantages of the invention can be appreciated from the following Description of Certain Embodiments of the Invention and the accompanying Drawing Figures.

DESCRIPTION OF THE DRAWING FIGURES

FIG. 5 is a schematic diagram of a circuit arrangement in accordance with the invention.

DESCRIPTION OF CERTAIN EMBODIMENTS OF THE INVENTION

As noted, the subject invention concerns a power management process and a system architecture that balances an ecological power source ("EPS") with a grid power connection and a battery. With every ecological source installation (e.g., solar energy collector, wind collector, or other D.C. source) there is an electronics box that manages the electricity produced by the solar panels, including how energy is to be distributed within a house that uses such solar panels or other ecological power source. In grid-interactive systems, surplus energy can be transferred to a utility company power grid ("the grid"). Because the grid operates with A.C. power, there are conversion inefficiencies in using an inverter and battery connections and so conventional approaches, as noted in FIGS. 1 and 2, are subject to tradeoffs in efficiency depending on the architectures of the power management scheme.

Figure 1:
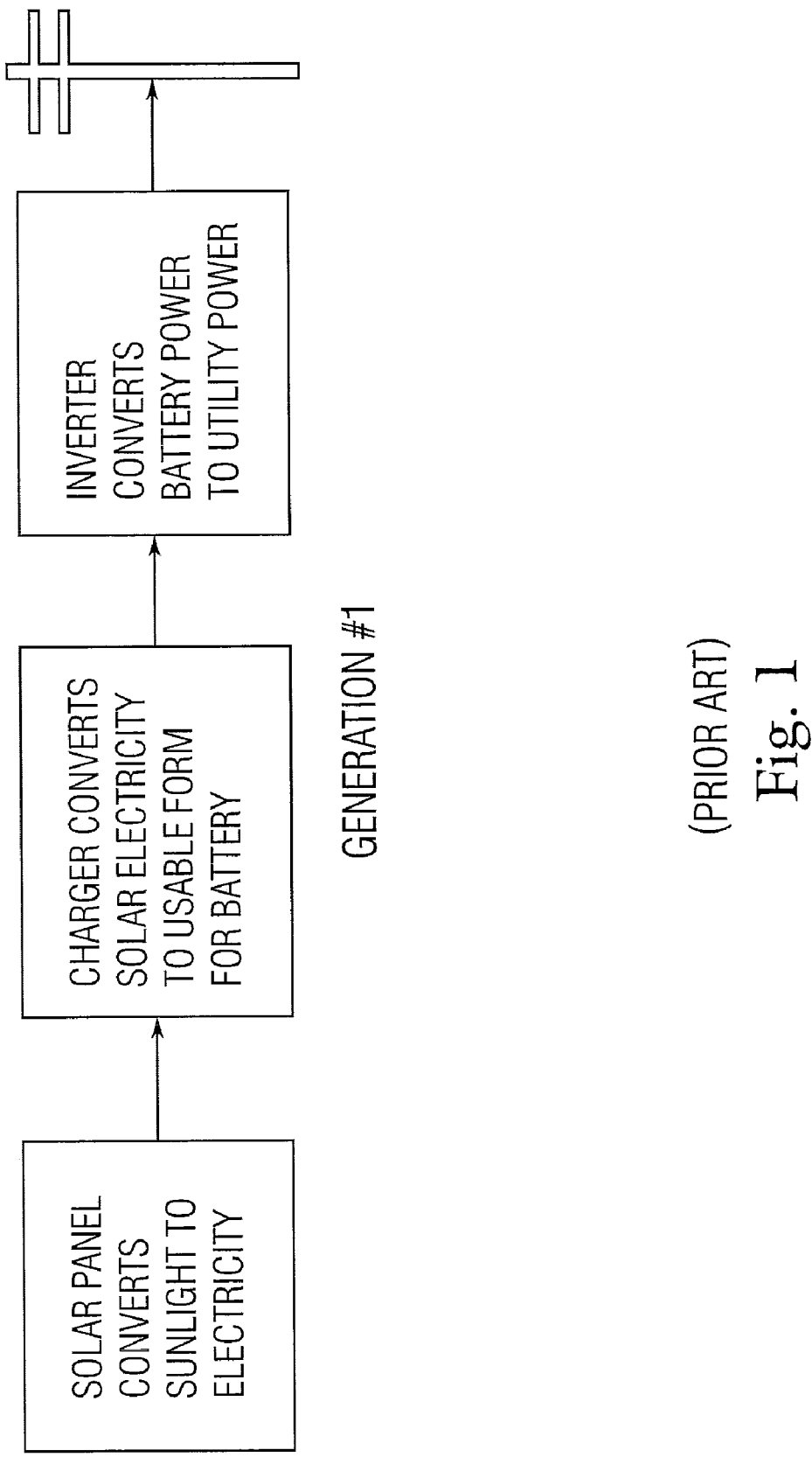
FIG. 1 is a schematic block diagram showing DC coupling arrangement for both charging a battery from an ecological power source ("EPS") and for sending excess power to the grid.
Figure 2:
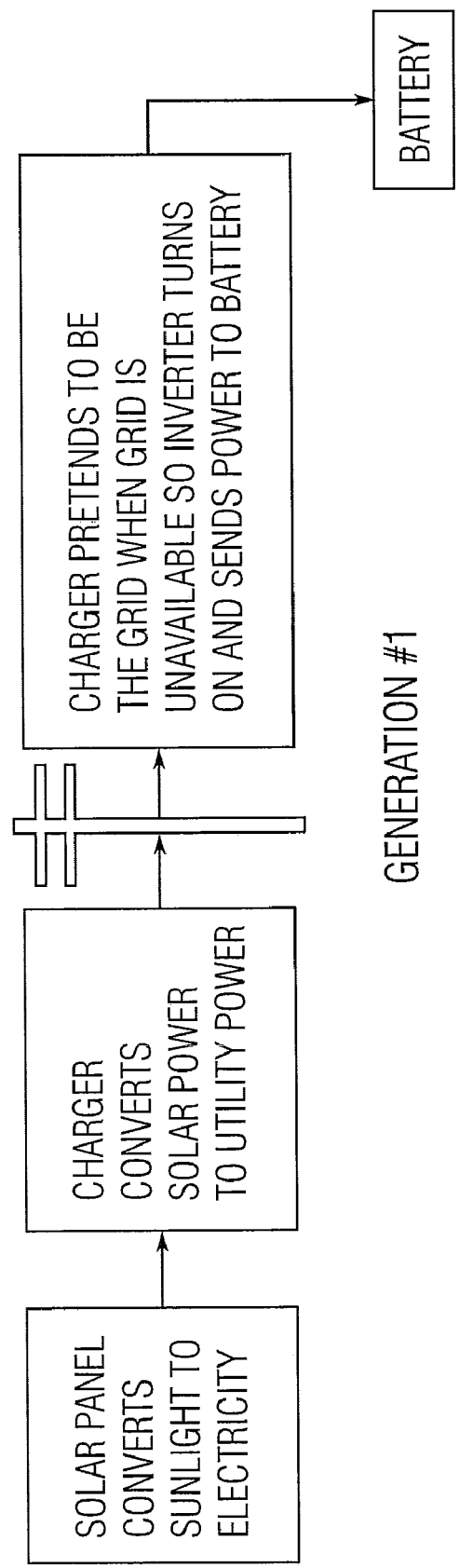
FIG. 2 is a schematic block diagram showing AC coupling arrangement for both charging a battery from an ecological power source and for sending excess power to the grid.
Figure 3:
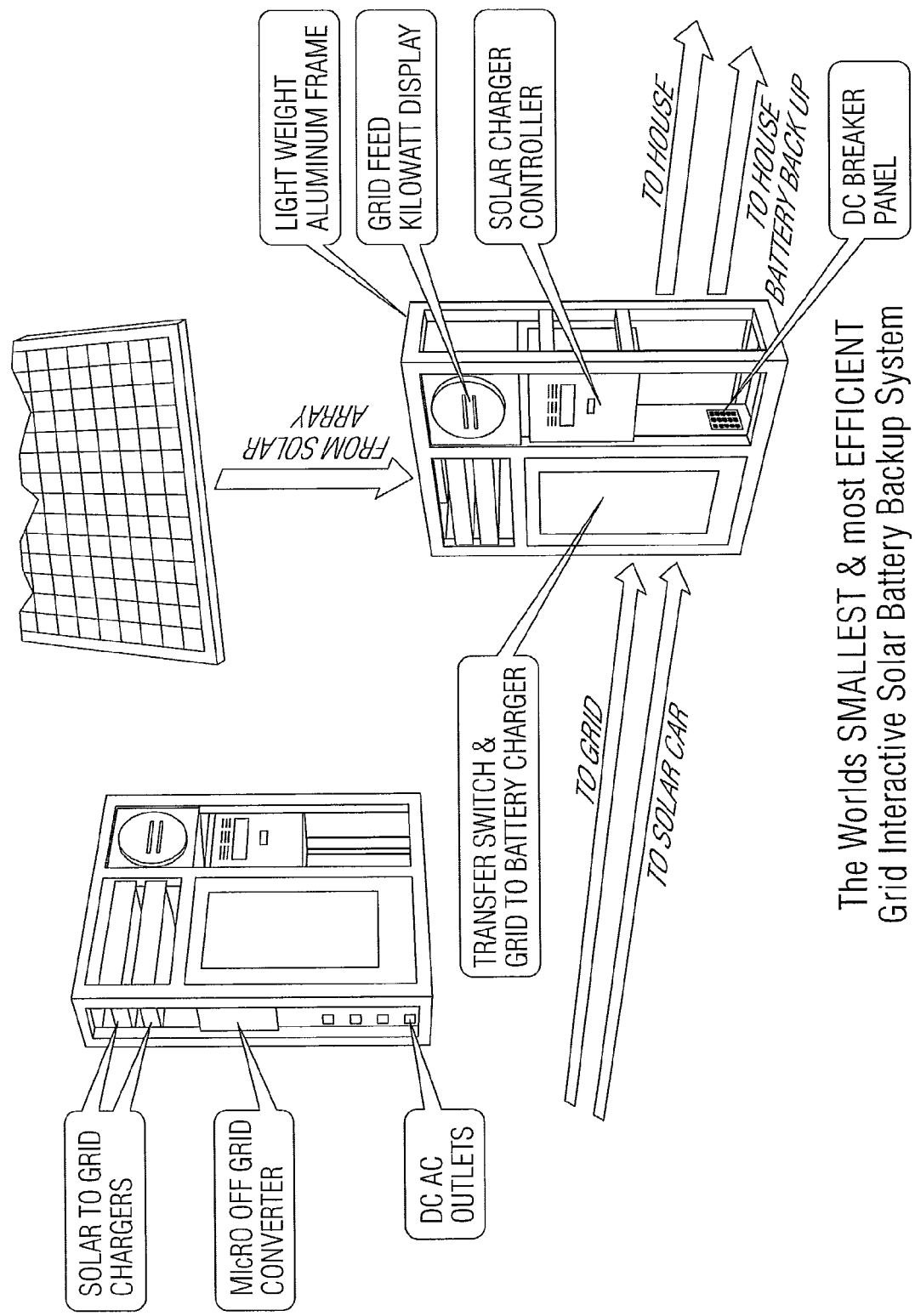
FIG. 3 is a stylized view of the structural features and connection arrangement of a grid interactive battery backup system in accordance with a broad aspect of the invention.

FIG. 1 shows a "generation #1" system, in which (Rule #1:) When energy is converted from one form to another there is always a loss. The greater the number of conversion steps the greater the loss. Above illustrates the generation 1 solar control where solar energy goes from the and to a DC/DC charger to a batter then to an inverter then to the grid. This is good for charging a battery as it requires 1 step but is bad at charging the grid because that is three steps. FIG. 2 shows a "generation #2" system, which concerns green technology which has but two rules: Nature has no waste and technology that ignores nature is doomed to fail. This schematic illustrates an AC coupled system. This system is great at feeding onto the grid because it has 1 step conversion but efficiency is sacrificed at charging a battery because that requires three steps.

The present invention seeks to ameliorate a fundamental design flaw associated with ecological power management. The invention does so by providing a grid interactive power management system that has a battery backup and that is also tied to the grid. Unlike those conventional systems that lack a battery backup, if there is a disruption in the grid (also known as a blackout), the ecological source is not automatically disconnected from the loads and so any ecologically-generated power is not wasted. Rather, the system of my invention includes ties to both battery and grid. Additionally, among traditional systems that do have a battery backup, they suffer from comparatively higher 'phantom load' or loss in efficiency as compared to the conventional grid-interactive systems that do not have a battery backup.

A grid interactive system with battery backup in accordance with the invention addresses this by supplying a limited amount of power for basic household needs during a power outage while alleviating the inefficiencies of traditional grid interactive battery backup systems. Examples of household usage include appliances, computers, lighting, and so on. In a system according to the invention, a small percentage of utility power is connected directly to a battery when the utility is available. As an example, the portion can be equivalent to 5% of the solar panels in the array. This portion of energy is provided directly to a battery for assuring the battery contains a full charge in the event of a utility power outage. Additionally when DC appliances are added, this power from the utility to maintain the battery also maintains the DC appliances connected to the battery. In this invention, we use a straight to the grid interactive inverter; thus, we are able to use the utility power as the 'primary' battery. All the energy from the ecological source is sent into a building and the utility credits this power off on the utility bill. When power is 'sold' to the grid there is no loss and so the customer can receive full credit for the power. When power is 'bought' the customer also can receive full credit. This is very different than using a battery for storage in which case, on average, 10% of the energy is lost in heat due to charging the battery and 10% is lost in heat during discharge of the battery—a total estimated loss of 20% for the round-trip. By using the utility as the primary battery when the utility is available, however, there is no loss associated in sending the power charge to the grid and receiving the power discharge from the grid. The 20% power loss on the ecological source only occurs if the grid is unavailable and the 'secondary' battery is operating directly with the ecological source. Additionally DC appliances are connected or bused to the 'secondary' battery so they can run directly from the ecological source without the 20% losses. This arrangement also differs from conventional approaches in which solar energy is wasted if the battery is fully charged.

The solar panel energy switches from a straight to AC inverter connection over to a straight to DC battery charger in order to maintain a one-step conversion in both modes of operation and thereby maximize efficiency.

Systems according to the invention, and the attendant process of power management, can be scaled to a range of power sizes, for instance, 200 watt, 400 watt and 2500 watt. In one implementation, for instance, the Ecojoule inverter is used as the off-grid inverter component because it works extremely well at preventing surge wear on batteries due to the use of supercaps. The parts used to construct a circuit arranged in accordance with the invention can be conventional.

Figure 4A:
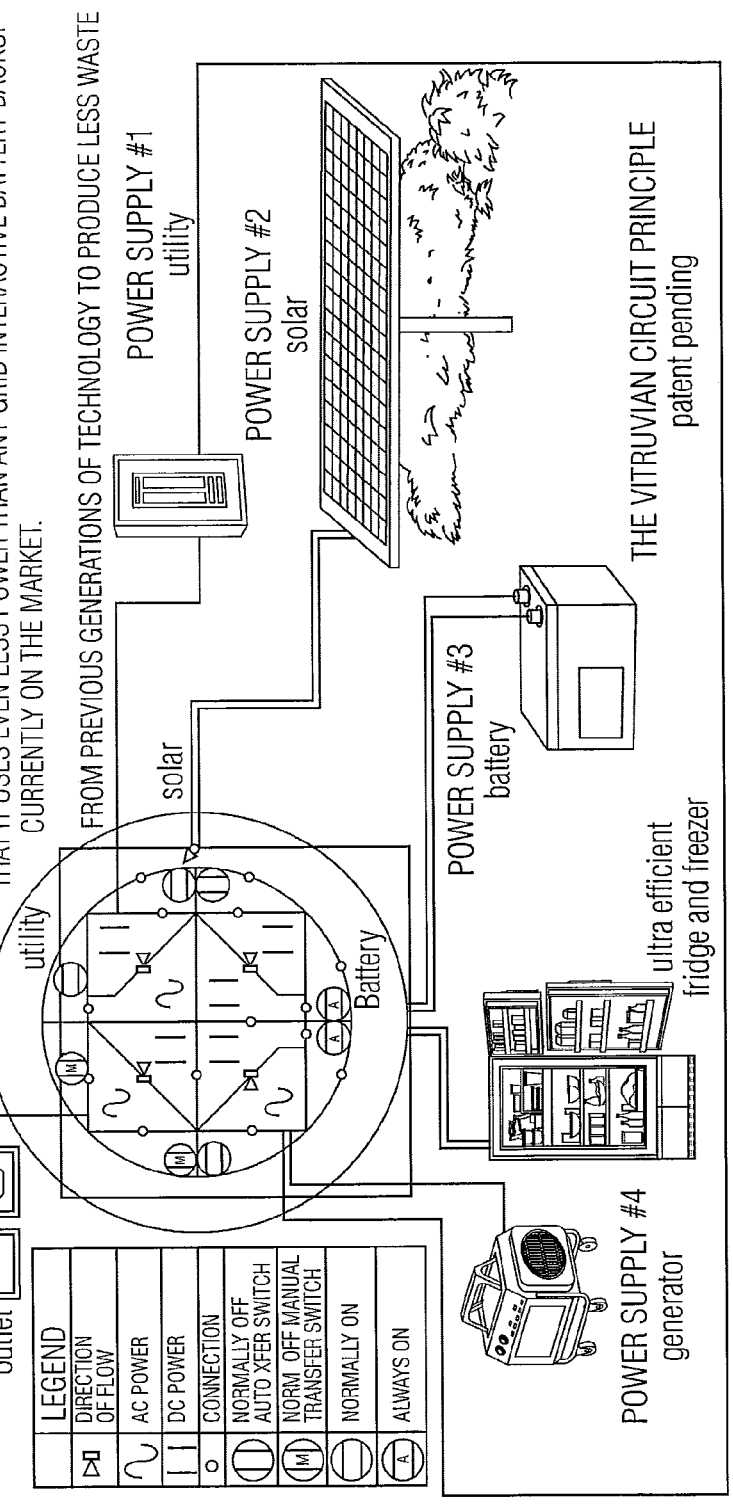
FIG. 4A illustrates the principle of 1-step conversion both in the mode of battery charging and in the mode of energy transfer to the grid.

The schematic diagram of FIG. 4A illustrates my system where the solar panel switches from a straight to ac converter and a straight to dc battery charger. This technique maintains a one-step conversion in both modes to maximize efficiency. While any power supply would suffice, this circuit is smart in that it uses even less power than any grid interactive battery backup currently on the market as compared to previous generations of technology and thus produces less waste.

Figure 4B:
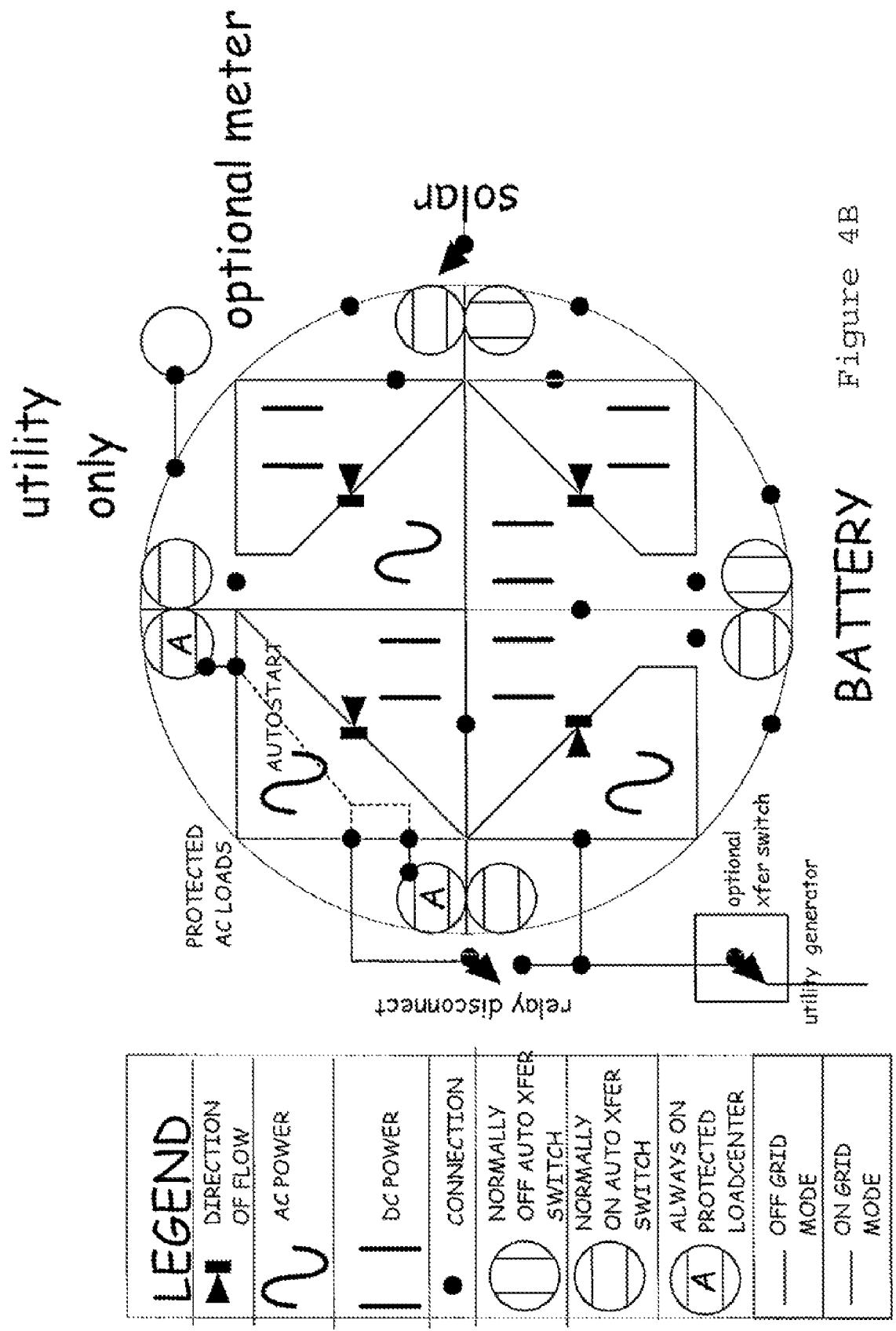
FIG. 4B illustrates the same principle as in FIG. 4A in an arrangement that includes an automatic AC relay.

Attached as FIGS. 4A and 5 are high level schematics of the parts that can be used to construct a power management system in accordance with a broad aspect of the invention. As can be seen, a 4 quadrant relay is employed in which the ecological source switches between charging to the utility grid or to the battery. On the secondary quadrants, a utility-grid-to-battery-charger maintains the battery to make sure that it is full in the event of utility power failure, and an "off grid inverter" provides simulated utility AC power to the protected loads when the utility is unavailable. The utility-grid-to-battery-charger is turned on when the grid is available and the off-grid inverter is turned off. (The grid power connection provides energy to the battery when the utility-grid-to-battery-charger is turned on, and that energy can be from the utility power company as delivered over the grid power connection, or from a parallel source of energy provided by the EPS; in either case, however, the battery charge is preferably in the range of no more than about 5% of the output of the EPS.) When the utility is unavailable the utility-to-battery-charger is turned off and the off-grid inverter is turned on. This is in opposition to the ecological source switching. The arrangement of FIG. 4A shows a manual start-up of the off-grid inverter, but an automatic version can be implemented using an AC relay (FIG. 4B). From the point of view of ecological source switching, when the utility is available the ecological source goes to the inverter to send the ecological source power to the AC utility grid and the ecological-source-to-battery charger is turned off. When the utility is unavailable the ecological source is sent to the battery and the grid-interactive inverter is turned off.

In an implementation of the invention, two independent inverters are utilized. One serves as a grid-interactive, parallel current source coupled with the utility and the other serves as a stand-alone power source for when the utility is unavailable (the so-called off-grid inverter). The two inverters are 'interlocked' through the switching arrangement shown in FIGS. 4A and 4B so that when one is turned on the other is turned off, and vice versa, with the applicable mode of operation being selected based on the availability of power from the grid.

The off-grid inverter can auto start during a power outage (or optionally be manually started). These two inverter devices are interlocked with each other so that the stand-by charger is turned on when the grid is available and the stand-alone inverter is off line, then when in a grid outage the stand alone inverter is on and the stand-by inverter is off. This too is governed by a power relay.

In both modes of operation it is necessary to charge the battery. In the grid interactive mode when the utility is operating to deliver power over the grid power connection, the battery is charged so that it is in a full state of charge when the mode of operation switches to an off-grid mode such as during a power blackout. Batteries typically will lose charge if left stagnant without any charge currents to replenish ordinary stand-by charge loss. To maintain the full state of charge, the grid is connected so as to apply a standby charge to the battery. Meanwhile, the ecological source only generates a battery charge during an off-grid mode. When in standalone mode, the charge from the ecological source is regulated by monitoring the battery voltage, temperature and off-grid inverter demand. If charge current is needed at an output less than the solar cell power, the DC-to-DC charger 'de-rates' reducing power to the battery bus. As such, the battery is charged by the ecological source only when the battery needs a charge, and the percentage of power when the controller connects the battery to the EPS varies with the needed charge to restore the battery to a fully-charged state. Thus, when utility power is available from the grid power connection (the second mode of power transfer), a trickle charge arrangement has the battery connected to the AC grid with the battery being charged only when the AC-to-DC charger monitors a loss in battery potential due to standby losses, e.g., as a result of the battery remaining idle for extended periods in which its unused potential is reduced due to chemical changes. In contrast, conventional DC coupled systems has the EPS sending full power output to the battery at all times. A grid interactive inverter can be used to monitor the total charge on the battery and respond to changes in battery charge by proportionally reducing EPS currents acting on the battery so as to prevent overcharging, but this conventional arrangement has the undesirable effect of having currents on the battery terminals even when charging is not necessary.

The arrangement of the present invention has two inverters arranged such that each operates in a different power transfer mode. A grid-interactive inverter is used whenever the utility power source is available over the grid power connection while an off-grid inverter of different circuit design is used in a utility power outage mode. In this way, conversion losses typical in prior art EPS systems are avoided. An inverter that is grid-interactive, that is, an inverter connected for parallel, tandem operation with the grid requires a significantly different (lower) capacitance than an off-grid inverter which is configured to operate independent of the utility grid. In order to accommodate surge loads such as result from deep-cycle devices (motors, condensers, and so on), a grid-interactive inverter can simply utilize the parallel utility power source to handle the load. However, the instant rush-currents required for such loads can only be supplied by an off-grid inverter if a significantly higher comparative capacitance circuit is provided so as to meet the instant rush-current requirements. The high capacitance, however, adversely sacrifices grid-feed efficiency, and so the off-grid inverter is only employed in the inventive arrangement during a utility power outage transfer mode.

In a present implementation, two Enphase grid chargers are used. The outputs of two panels operate independent and are connected in parallel on the secondary charger. The circuit breaker and wiring is adjusted accordingly.

By way of example and not limitation, one implementation can have a six-pole/double throw (6P/DT) power relay that supplies 125 VDC ecological source current in one mode and 600V when 6 poles are connected in series. This implementation enables universal coupling to any high VDC solar grid interactive inverter in order to assimilate into the integrated circuit, notwithstanding the fact that the solar cell array needs to operate with a low-voltage battery charger in an off-grid mode and a high-voltage grid-interactive inverter in an on-grid mode. The management system has a primary to secondary wiring ratio of 1:3, and so a 600 VDC primary and a 200 VDC secondary can be had by switching combinations of parallel and serial connections on the output side of the transfer panel of the ecological source.

Figure 6:
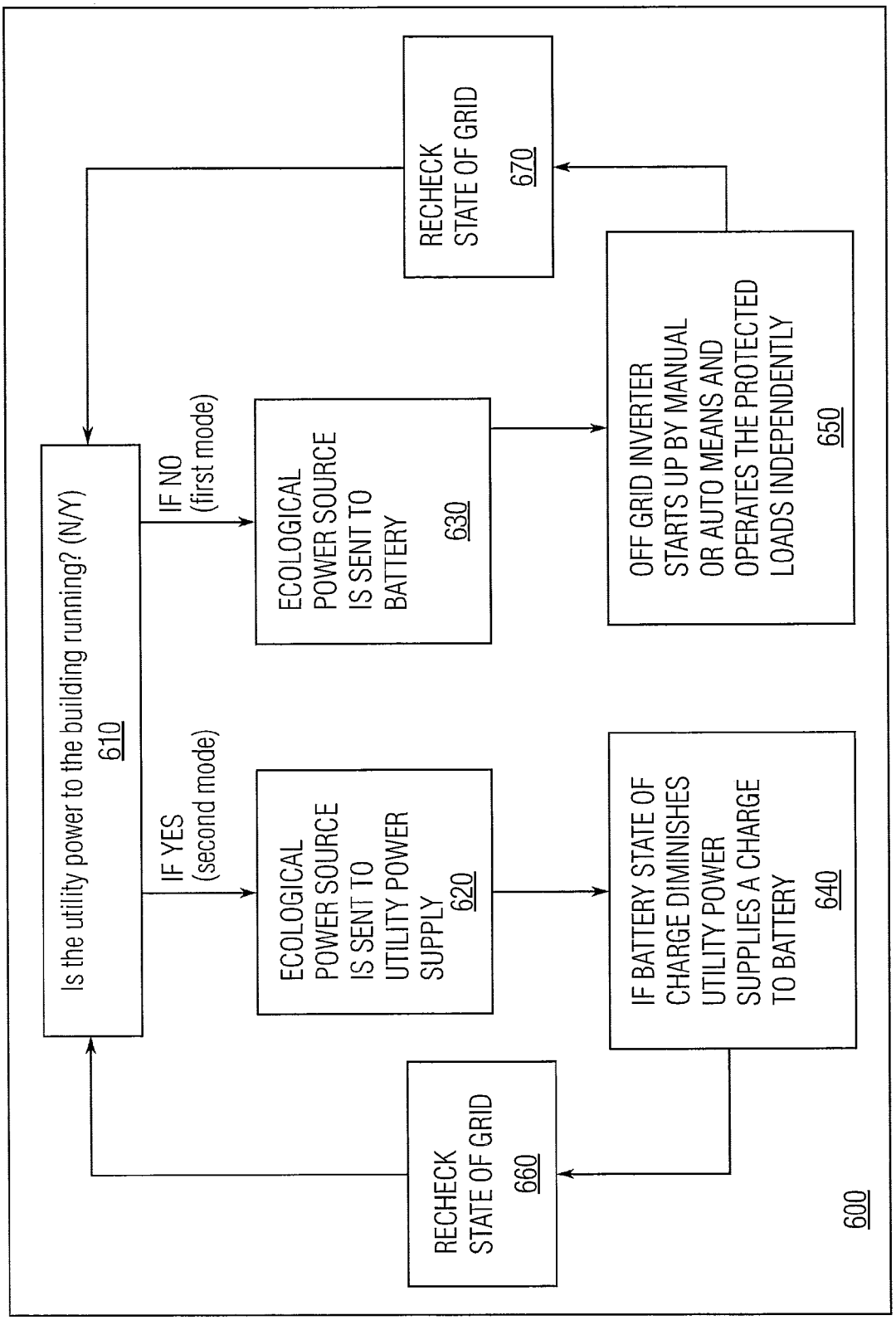
FIG. 6 is a top-level flow diagram illustrating operation of a grid interactive battery backup system in accordance with a broad aspect of the invention.

Referring now to FIG. 6, a process 600 suitable for balancing respective outputs of an ecological power source, a grid power connection, and a battery is illustrated in accordance with a broad aspect of the invention which is able to minimize conversion losses regardless of operating mode (that is, whether connected to a live utility power connection or operating off of the EPS). A controller monitors (step 610) the availability of utility power output over the grid power connection, and controls, in a single switching operation, whether power from the EPS is sent to the utility power supply (step 620) or is sent to a battery back-up (step 630). Preferably, the switching operation is automatic in response to a detected interruption of the utility power output over the grid power connection. The direction of power transfer is a function of two provided modes of operation. In a first mode of power transfer provided by the arrangements described herein, the process flow 600 applies the EPS output directly to the battery to charge it during times of a utility power outage, as indicated at step 630. In a second mode of power transfer provided by the arrangements described herein, the process flow 600 applies the EPS output so that it is fully delivered through a grid-interactive inverter so as to provide A.C. power to the grid power connection, as indicated at step 620.

When the utility power is available (the second mode path), which is a typical operating mode, the controller monitors the battery state and after the charge has diminished from a full-charge state, a percentage of utility power output over the grid power connection is supplied to the battery through the utility power connection and not from the EPS, as indicated at step 640. Preferably, the percentage is a small, variable percentage with the majority of the utility power output over the grid power connection is supplied to a load when the controller is switched to the second mode of power transfer. As such, when the controller is switched to the second mode of power transfer, the method utilizes the output of the grid power connection as a source to maintain the battery in a charged condition for use during the times of the utility power outage. The controller constantly checks the state of the grid power connection, as indicated at step 660, and the process loops as indicated at block 610.

Meanwhile, if the utility power is not available (the first mode path), then the off-grid inverter is started, either manually or automatically by the controller, to convert charge stored in the battery into A.C. power when the controller is switched to the first mode of power transfer and thereby provide AC power to loads connected to the protected outlets downstream of the off-grid inverter, as indicated at step 650.

The controller constantly checks the state of the grid power connection, as indicated at step 670, and the process loops as indicated at block 610.

In use, the arrangements described herein and the process described above enable alternative power transfer modes that are switchable from one to another with each providing a one-step conversion of the output of the EPS into A.C. power such that energy from the EPS is transferred to the grid power connection after inversion by a grid-interactive inverter free of any battery storage when in the first mode of power transfer, and energy from the EPS is transferred to a load after inversion by an off-grid inverter when in the second mode of power transfer.

While the invention has been described in connection with certain embodiments thereof, the invention is not limited to the described embodiments but rather is more broadly defined by the recitations in the claims presented below and equivalents thereof.

I claim:

1. A method for balancing respective outputs of an ecological power source ("EPS"), a grid power connection, and a D.C. battery so as to minimize conversion losses, comprising:
    providing a first mode of power transfer in which the EPS output directly charges the D.C. battery during times of a utility power outage;
    providing a second mode of power transfer in which the EPS output is fully delivered through a grid-interactive inverter so as to provide A.C. power to the grid power connection;
    controlling in a single switching operation the first and second modes of power transfer as a function of an availability of the utility power output over the grid power connection,
    the single switching operation including the step of:
        switching an interlocked arrangement of a grid-interactive inverter and an off-grid inverter so that when one of the grid-interactive and off-grid inverters is turned on the other is turned off, wherein the EPS is switched from a straight-to-A.C. inverter connection via the grid-interactive inverter while in the second mode of power transfer to a straight-to-D.C. connection to charge the battery while in the first mode of power transfer in order to maintain a one-step conversion in both the first and second modes of power transfer;
    wherein a percentage of utility power output over the grid power connection is supplied directly to the battery when the controller is switched to the second mode of power transfer so as to utilize the output of the grid power connection as a source to maintain the battery in a charged condition for use during the times of the utility power outage, and
    wherein an off-grid inverter converts charge stored in the battery into A.C. power when the controller is switched to the first mode of power transfer; and
    trickle charging the battery through the grid power connection in the second mode of power transfer.

2. The method of claim 1, wherein a majority of the utility power output over the grid power connection is supplied to a load when the controller is switched to the second mode of power transfer.

3. The method of claim 1, wherein the off-grid inverter is configured with high-capacitance as compared to the grid-interactive inverter so as to accommodate surges in the load.

4. The method of claim 1, wherein the percentage of utility power output over the grid power connection that is being supplied directly to the battery when the controller is switched to the second mode of power transfer is variable.

5. The method of claim 4, wherein a remainder of the utility power output over the grid power connection is being supplied to one or more loads when the controller is switched to the second mode of power transfer.

6. The method of claim 5, wherein, in the second mode of power transfer, all of the output from the EPS is directed to the grid-interactive inverter for delivery to the grid power connection.

7. The method of claim 1, wherein the battery is charged by way of the grid power connection so long as there is utility power output over the grid power connection.

8. The method of claim 1, wherein the controlling step automatically switches between the first and second modes of power transfer in response to a detected interruption of the utility power output over the grid power connection.

9. The method of claim 1, wherein each of the power transfer modes has a one-step conversion of the output of the EPS into A.C. power such that:
    energy from the EPS is transferred to the grid power connection after inversion by a grid-interactive inverter free of any battery storage when in the first mode of power transfer, and
    energy from the EPS is transferred to a load after inversion by an off-grid inverter when in the second mode of power transfer.

10. The method of claim 1, wherein the EPS is a D.C. source.

11. The method of claim 1, wherein the EPS is a wind collector, a solar energy collector, or both.

12. The method of claim 1, wherein the EPS comprises an array of solar energy collectors, and wherein each collector in the array is controlled by the controlling step using a single switching operation.

13. The method of claim 1, wherein the trickle charging occurs only when an AC-to-DC charger monitors a loss in battery potential due to standby losses.

* * * * *